United States Patent [19]

Mekler

[11] Patent Number: 4,620,390

[45] Date of Patent: Nov. 4, 1986

[54] METHOD AND APPARATUS FOR REORIENTING PLANT PRECURSORS DURING GROWTH

[76] Inventor: Dan Mekler, P.O.B. 1040, Jerusalem 91009, Israel

[21] Appl. No.: 659,946

[22] Filed: Oct. 11, 1984

[30] Foreign Application Priority Data

Oct. 16, 1983 [IL] Israel ........................................ 69976

[51] Int. Cl.$^4$ ............................................. A01G 9/10
[52] U.S. Cl. ........................................ 47/58; 47/1 A; 47/73; 47/86
[58] Field of Search ................... 47/73, 77, 85, 86, 87, 47/58, 56

[56] References Cited

U.S. PATENT DOCUMENTS

| 1,758,128 | 5/1930 | Rosevear | 47/73 |
| 3,014,614 | 12/1961 | Carroll et al. | 47/73 X |
| 3,032,927 | 5/1962 | Kobs | 47/73 |
| 3,139,701 | 7/1964 | Nishiushi | 47/58 |
| 3,515,036 | 6/1970 | Oki et al. | 47/77 |
| 3,546,055 | 12/1970 | Spertus | 47/86 X |
| 4,167,911 | 9/1979 | Masuda et al. | 47/73 X |

FOREIGN PATENT DOCUMENTS

| 367307 | 9/1959 | Japan | 47/56 |
| 936554 | 9/1963 | United Kingdom | 47/56 |
| 1160390 | 6/1969 | United Kingdom | 47/86 |

*Primary Examiner*—F. Barry Shay
*Attorney, Agent, or Firm*—Browdy and Neimark

[57] ABSTRACT

A sheet having apertures registering with said locations of the receptacle in the first orientation is used to distribute seeds or tissue culture elements. The receptacle may be placed in a growth medium reservoir and the plant precursors delivered through conduits from the apertured sheet to the receptacle by means of pressurized gas. After some growth the receptacle is reoriented to the second orientation. Apparatus is disclosed to perform the reorientation.

18 Claims, 16 Drawing Figures

METHOD AND APPARATUS FOR REORIENTING PLANT PRECURSORS DURING GROWTH

FIELD OF THE INVENTION

The present invention relates to apparatus for plant growth and development in general and, in particular, to apparatus for planting plant precursors and transferring the plantlets grown therefrom to larger growing surfaces.

BACKGROUND OF THE INVENTION

In recent years there has been a tremendous increase in the use of tissue cultures as a means of breeding plants. It is known that breeding by this method produces the best proliferation of the parent plant which was specifically chosen for its particular traits. Preparation of plants by this breeding method is carried out in the laboratory. The product available for purchase is in the form of boxes containing plantlets which were grown densely on a culture medium.

The farmer receives these boxes and must separate the plantlets from the culture medium and then plant each plantlet, one at a time, in the appropriate growing means, whether it be a growing tray, growing table or any other growing surface. The separation of the plantlets from one another and their replanting is hard and tedious work due to the fact that the plantlets are small and delicate and are densely packed together and entangled on the growing medium. For example, the height of the plantlets may be 5 to 10 millimeter while the width of the stems is less than one millimeter, and, in a box which is 11 cm by 11 cm, some 250 plantlets will be growing.

The results of this situation are three-fold. First, many plantlets are damaged during the transfer process. Second, many times the farmer is unable to separate the clumped plantlets into individual plantlets, so the planting is not uniform. Third, and most serious, is that due to the fact that the transfer process is so time consuming, there is often a significant time difference between the time the first plantlets are transferred to the new growing surface and the time the last plantlets are transferred when the farmer is planting a large growing area. This presents particular problems because plantlets at different stages of growth require different treatment and different environmental conditions. Thus, plantlets which are transferred over a relatively long period of time are often of different ages and in different growth stages by the time the transfer is complete, so the entire growing area cannot be treated at once and in the same manner. The great transfer time is also very costly. Finally, the produce of the farmer will not be ready for harvesting at one time, but over a range of dates corresponding to the transfer dates of the plantlets.

In order to fully understand the apparatus of the present invention, a brief description of the final stages of tissue culture in the laboratory is required. Plant material, which has undergone various processes during the growth process in the laboratory, emerges as plant precursors in the shape of objects similar to little balls or crumbs, which are called callus. These plant precursors are analogous to seeds.

The bodies of the callus are distributed on a nutrient base within boxes at a predetermined density. This density of distribution is required by the physiology of the plant growth. These boxes are closed and, by maintaining them in the proper environmental conditions in the laboratory, plantlets grow from the callus. Once the plantlets have grown in the desired size, the boxes, as stated above, are provided to the farmer who transfers the young plantlets to a different growing surface for continuation of their growth.

SUMMARY OF THE INVENTION

It is an object of the present invention to provide apparatus for mechanically and automatically planting plantlets which were generated by tissue culture or from seeds or by any other means.

There is thus provided in accordance with the present invention apparatus for plant growth and development including a plant precursor development receptacle defining a plurality of plant development locations thereon, the receptacle defining two operative orientations wherein, in a first operative orientation, the plant development locations are spaced one from another by a first distance, and, in a second operative orientation, the plant development locations are spaced one from another by a second distance.

According to a preferred embodiment, the development receptacle includes a foldable element which assumes its first operative orientation when folded and assumes its second operative orientation when unfolded.

Further according to a preferred embodiment, the development receptacle also includes an aperture located at each development location, and the apparatus further includes growth medium apparatus arranged to underlie the plant development locations when the receptacle is oriented in its first orientation.

Still further according to a preferred embodiment, the apparatus further includes distribution apparatus for distributing a plant precursor to each of the plant development locations when the receptacle is oriented in its first operative orientation. Preferably, the distribution apparatus includes an apertured sheet or plate having apertures oriented in registration with the plant development locations when the receptacle is in its first operative orientation.

Additionally in accordance with the present invention the apparatus further includes apparatus for reorienting the receptacle from the first operative orientation to the second operative orientation with partially developed plants located in the plant development locations. Preferably the reorienting apparatus includes a plurality of engagement means movable simultaneously along two perpendicular axes for removable engagement with portions of the receptacle for effecting unfolding thereof in a plane.

Further according to the present invention, the apparatus also includes apparatus for disengaging partially developed plants from the development locations and relocating them in registration with different plant development locations when the receptacle is oriented in its second operative orientation. Preferably the disengaging apparatus includes pressurized gas driven apparatus for engaging the partially developed plants with a flow of pressurized gas.

There is also provided in accordance with the present invention a method of plant development including the steps of distributing plant precursors in a plant development receptacle which is associated with a first growth medium, the receptacle being in a first spatial orientation, producing partial plant development in the first growth medium, changing the orientation of the plant development receptacle to a second spatial orientation wherein the spacing between the resulting plants is increased, and transferring the resulting plants from the plant development receptacle in the second spatial orientation to a second growth medium in registration with the orientation of the resulting plants in the second spatial orientation.

BRIEF DESCRIPTION OF THE DRAWINGS

The apparatus and method of the present invention will be further understood and appreciated from the following detailed description taken in conjunction with the drawings in which.

DETAILED DESCRIPTION OF THE INVENTION

The apparatus of the present invention operates on the principle of carrying out the final stages of tissue culture or the early stages of seed development on a flexible sheet defining a plurality of small cells which are produced by folding the sheet in such a way that the cells are close to one another, and unfolding the sheet once plantlets of a desired size have grown, thereby separating the plantlets from one another to the desired distance for automatic transfer onto a suitable growing surface. A plant precursor is placed within each of the cells when the sheet is in its folded orientation, the sheet being adapted for seating on a nutrient base within a closable receptacle within which the plant precursors can grow into plantlets. When the plantlets reach the desired size, the sheet is removed from the receptacle and unfolded onto the desired growing surface, and the plants are mechanically and automatically transferred from the sheet into the growing surface.

Figure 1:
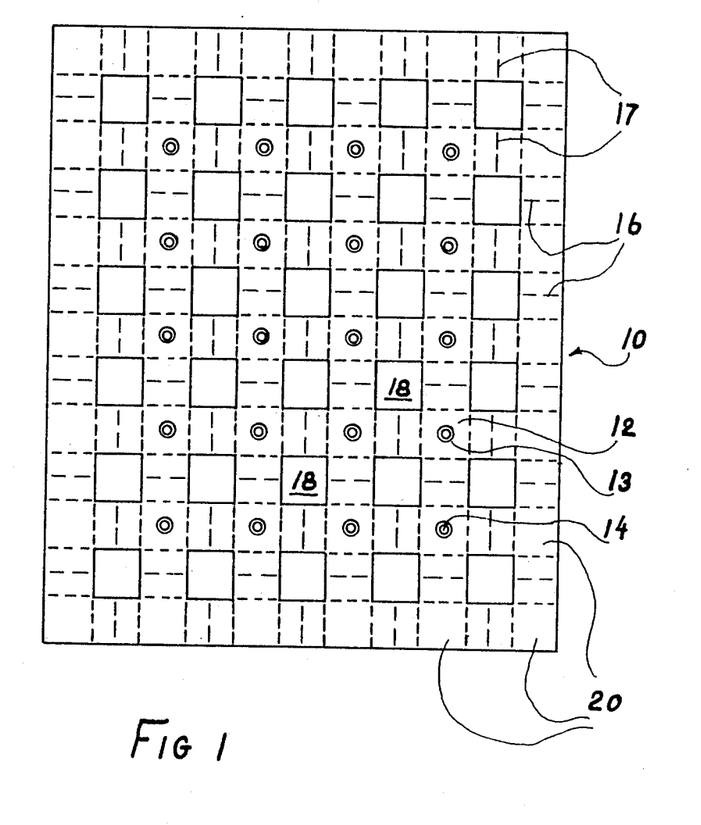
FIG. 1 is a top view illustration of plant growth and development apparatus constructed and operative in accordance with the present invention in an unfolded orientation.

With reference to FIG. 1, there is shown a plant precursor development receptacle 10 comprising a sheet of flexible web material which is arranged to adopt two operative orientations, folded and unfolded. Receptacle 10 may comprise any suitable web material which is flexible for folding, non-toxic to plants, and resistant to water and plant nutrients. Suitable material includes plastics such as polystyrene or P.V.C. of about 0.02–0.05 mm thickness. According to a preferred embodiment, receptacle 10 comprises a porous material or a material in which pores have been formed.

Receptacle 10 defines a plurality of plant development locations or cells 12. Each plant development location 12 preferably defines a truncated conic funnel 13, in the bottom of which is punched a plant receiving aperture 14. Apertures 14 are of the proper size for the particular plants to be grown therein. Apertures 14, when the receptacle 10 is in the unfolded orientation, are located at the distance from one another at which it will be desired to plant the partially developed plantlets when they have grown. Disposed about plant development locations 12 are a plurality of transverse foldable locations 16, a plurality of foldable locations 17 perpendicular to locations 16, and folding apertures 18. A plurality of edge surface locations 20 are distributed about the periphery of the receptacle 10, preferably alternating with foldable locations 16. Funnels 13 and folding locations 16 and 17 may be, for example, thermally formed, and plant receiving apertures 14 and folding apertures 18 may be punched in sheet 10 by any conventional means.

It will be appreciated that the distance between adjacent foldable locations 16 and adjacent foldable locations 17 is determined so as to provide the desired distances between plant growth locations in both the folded and unfolded orientations. The size of foldable locations 16 and 17, when folded, also provides distance beneath plant growth locations 12 for root growth and development.

Figures 2, 3, 4, 16:
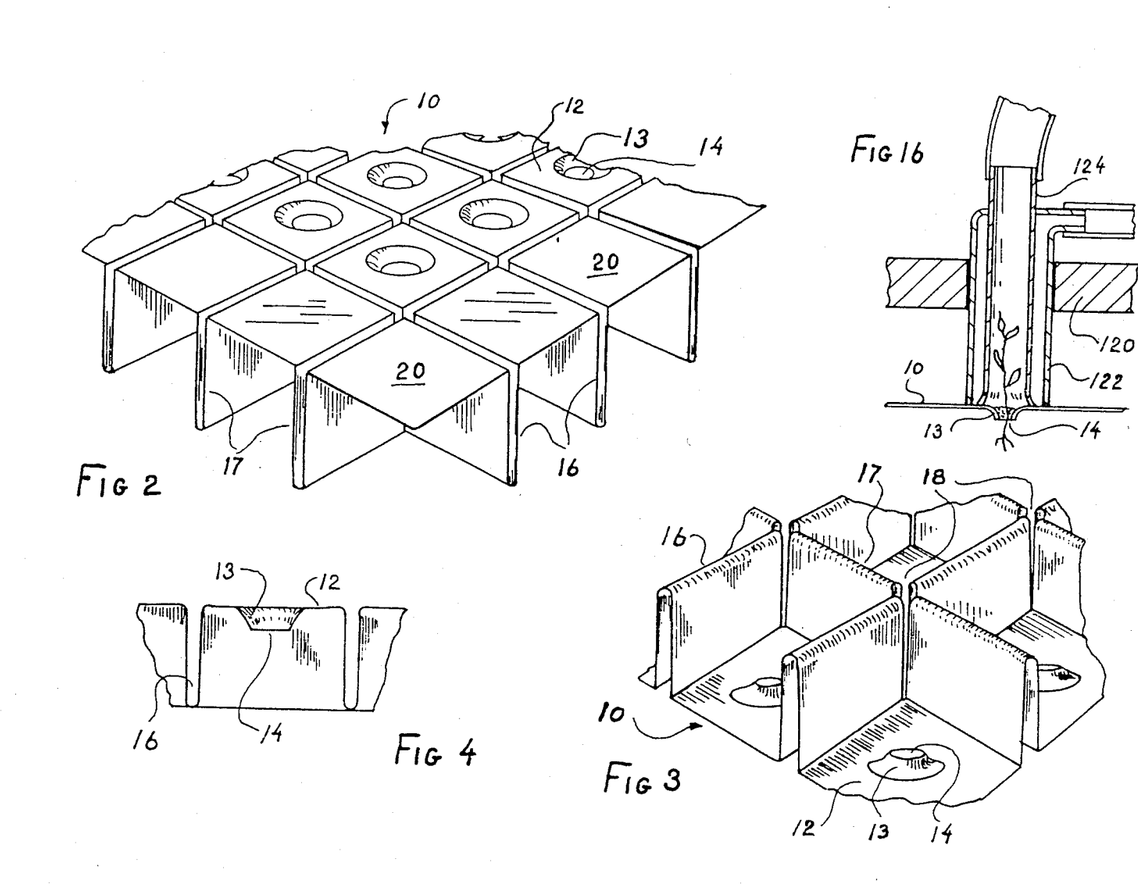
FIG. 2 is a detail view of a corner of the apparatus of FIG. 1 in a folded orientation.
FIG. 3 is a portion of the apparatus of FIG. 2 shown upside down.
FIG. 4 is a sectional illustration through a portion of the apparatus of FIG. 2.
FIG. 16 is a sectional illustration of apparatus for transferring partially developed plantlets constructed and operative in accordance with an embodiment of the present invention.

Referring now to FIG. 2, there is shown a corner portion of receptacle 10 in a folded orientation. As can be seen, sheet 10 is folded at foldable locations 16 and foldable locations 17 and forms leg elements which support the plant development locations 12. Folding apertures 18 (seen more clearly in FIG. 3) are provided of the size and location to permit folding of sheet 10. Edge surface locations 20 serve to define a border about the edges of the folded receptacle 10, preventing water and nutrients from spilling out of the receptacle. Edge surface locations 20 may also serve as seating surfaces for seating receptacle 10 in a suitable growth medium means and as engagement surfaces for removal of the receptacle 10 from the growth medium means.

FIG. 3 is a bottom view of a portion of the receptacle 10 in a folded orientation. Here the interaction of folding locations 16 and 17 to define leg elements can be more clearly seen. The role of folding apertures 18 in permitting this folding along two perpendicular axes can also be seen. FIG. 4 is a sectional illustration through one of the plant development locations and associated leg elements.

It is a particular feature of the present invention that a single receptacle 10 is suitable for plant growth and development in both the early stages, when one interplant distance and certain growth conditions are required, and in later stages when a second, greater interplant distance and different growth conditions are required. Transference of the receptacle 10 from one growth medium to another with concomitant unfolding of the receptacle provides this result. It will be appreciated that partial unfolding of the receptacle is also operative when several stages of growth wherein different interplant distances or growth in different nutrients or growth media is desired.

It is a further particular feature that receptacles 10 suitable for growth and development of any plant from plant precursors including tissue culture and seeds can be generated. The difference between the receptacles for different plants will lie in the different distance required between plant development locations 12 in each of the folded and the unfolded orientations, which in turn determines the size of the various folding locations and apertures.

Figure 5:
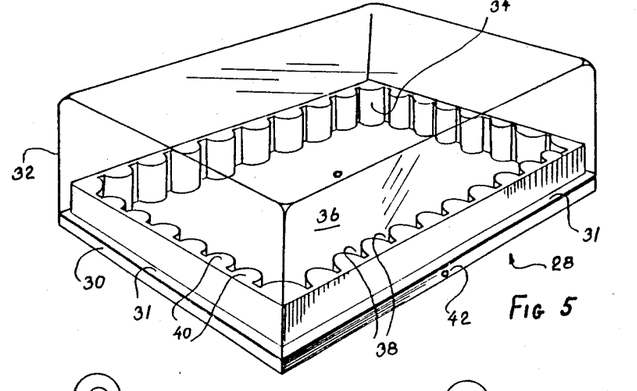
FIG. 5 is a perspective illustration of a container including growth medium apparatus in which the apparatus of FIG. 2 is adapted to seat.

Turning now to FIG. 5 there is shown a vessel 28 including growth medium means for early growth and development of plant precursors constructed and operative in accordance with the present invention, and particularly suited to the last stage of tissue culture development in the laboratory. The vessel 28 comprises a base 30 defining an indented step 31 and a removable cover 32. Removable cover 32 comprises a transparent material such as glass or clear plastic in order to permit transmission of light into vessel 28. Seated upon base 30 is a plant receptacle frame 34 arranged to surround and define a growth medium reservoir 36. Frame 34 defines a plurality of regularly spaced recesses 38 and projecting seating surfaces 40 therebetween. An inlet 42 is provided in base 30 communicating with the growth medium reservoir 36 for the introduction of growth medium into vessel 28.

It will be appreciated that recesses 38 are spaced at the same intervals as exist between adjacent folding elements 16 and 17 to permit seating of receptacle 10 in vessel 28. Edge surface locations 20 on receptacle 10 are arranged for engagement with seating surfaces 40. When receptacle 10 is seated within frame 34, the leg elements defined by the folding locations 16 and 17 depend into growth medium reservoir 36. A suitable growth medium, such as agar, is injected, preferably in liquid form, into the growth medium reservoir via inlet 42 until growth medium reservoir 36 is filled up to receptacle 10. When the agar or other medium gels, it serves to support receptacle 10 within vessel 28. Inlet 42 is then closed by any conventional plugging means. Vessel 28 is now ready for the introduction of plant precursor material, such as callus.

It is a particular feature of the present invention that free flow of materials, including hormones, in the growth medium between the developing plants is possible. This is particularly important in the early stages of plant development. This flow is permitted via the folds of folding locations 16 and 17, apertures 18, and pores in the receptacle 10, if present.

Figure 6:
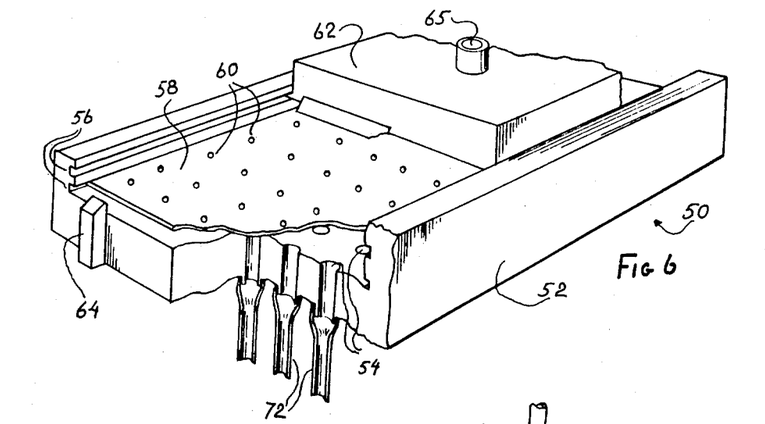
FIG. 6 is a partially cut away perspective illustration of the upper portion of apparatus for distributing plant precursors to the apparatus of FIG. 2 operative in the apparatus of the present invention.
Figure 7:
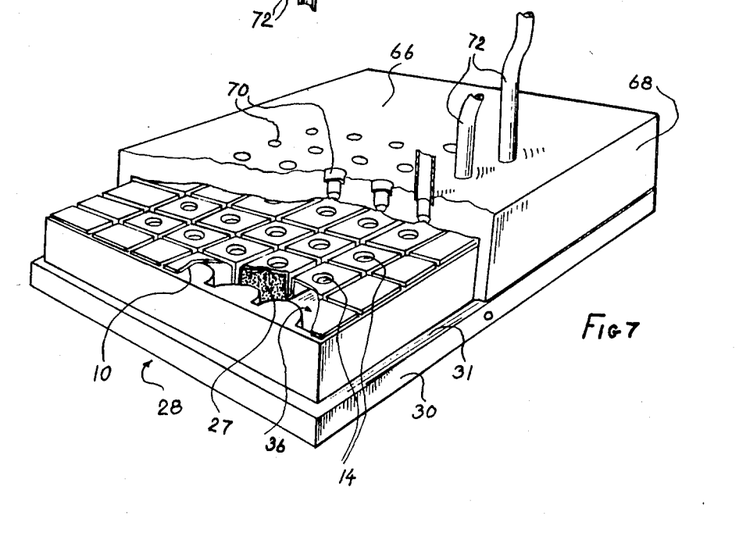
FIG. 7 is a partially cut away perspective illustration of the bottom portion of apparatus for distributing plant precursors to the apparatus of FIG. 2 operative in the apparatus of the present invention.

Referring now to FIGS. 6 and 7 there is shown apparatus 50 for distributing plant precursors to plant development apparatus constructed and operative in accordance with an embodiment of the present invention.

Apparatus 50 comprises an upper base 52 mounted in a retaining frame (not shown). Upper base 52 defines a plurality of apertures 54 in the bottom thereof, and defines a pair of tracks 56 in the sides thereof. Slideably mounted in the lowermost track 56 is an apertured sheet 58 defining apertures 60. Apertures 60 are complementary in number and distribution to apertures 54 in upper base 52 but are smaller in size.

Slideably mounted in upper track 56 above sheet 58 is means 62 for delivering a burst of pressurized air, coupled to a source of pressurized air (not shown) via an inlet 65. A stop member 64 is provided in upper base 52 suitable for engaging both sheet 58 and pressurized air means 62.

Apparatus 50 further comprises a lower base 66 defining side walls 68 adapted for seating upon recessed step 31 or base 30 of vessel 28. Lower base 66 defines a plurality of apertures 70 therein corresponding in number and distribution to apertures 14 in plant development locations 12 in a receptacle 10 seated within vessel 28 and in registration therewith. Apertures 70 are coupled to apertures 54 as by flexible tubing 72.

The operation of the apparatus of FIGS. 6 and 7 is as follows. Apertured sheet 58 is moved along upper base 52 until apertures 60 are not in registration with apertures 54. A suitable amount of tissue culture material is spread over apertured sheet 58 so that one unit of callus enters each aperture 60. Apertures 60 are of such size, that is diameter and depth, that one unit of callus, and one only, can fit therein. It will be appreciated that, since callus of each different plant may be of a different size, a suitable apertured sheet 58 of sufficient depth and with apertures of sufficient size that only one unit of callus can fit into the aperture is required for each type of plant.

Once apertures 60 are all filled, apertured sheet 58 is slid along upper base 52 until it contacts stop member 64. In this orientation, apertures 60 in sheet 58 are in registration with the complementary apertures 54 in upper base 52. Means 62 for providing a burst of pressurized air is moved along sheet 58, the pressurized air urging the callus in apertures 60 to pass through sheet 58, through apertures 54, via tubing 72 through apertures 70 and into apertures 14 in the plant development locations in receptacle 10 therebelow. Since the growth medium 27 underlying receptacle 10 is in the form of a gel, the callus will not fall through aperture 14 into culture medium reservoir 34, but rather will rest upon the culture medium within aperture 14 and develop thereon. It will be appreciated that since only one unit of callus was in each aperture 60, only one unit will be moved to each plant development location on receptacle 10. Lower frame 66 is removed from vessel 28 which is now closed by placing cover member 32 thereon and the vessel is maintained in the appropriate environmental conditions for plant growth.

It will be appreciated that from this stage on, the growth and development of plants from plant precursors other than tissue culture, such as seeds, is identical to that of tissue culture plants. The initial planting of seeds and other plant precursors in receptacle 10 may be accomplished by means of the apparatus illustrated in FIGS. 6 and 7, manually, or by any other suitable method.

Figures 8, 10, 11, 14, 15:
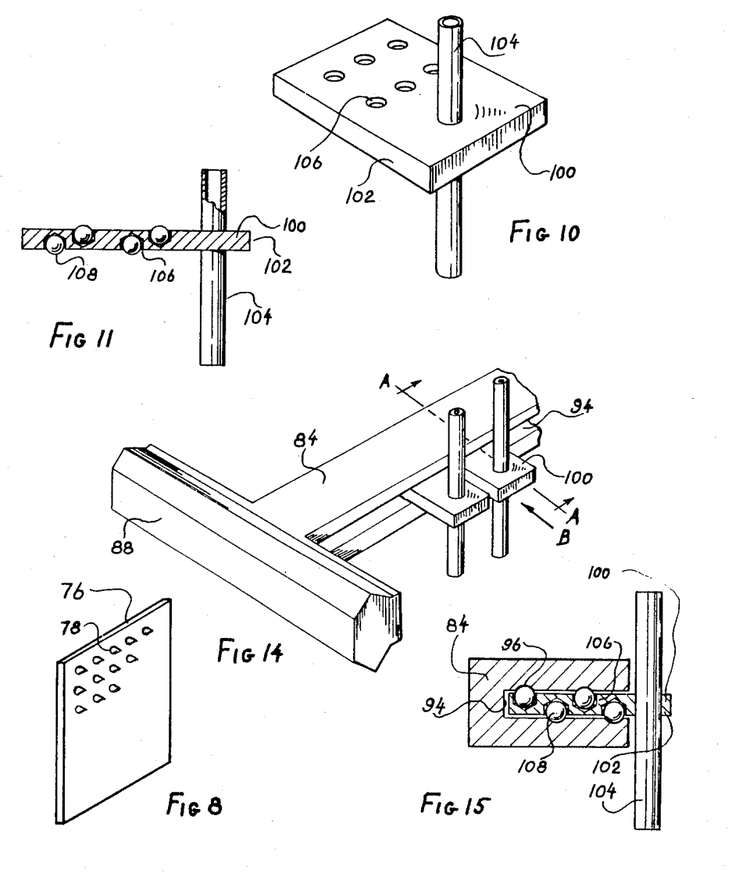
FIG. 8 is a perspective illustration of a tool for digging holes for planting of plantlets operative in the apparatus of the present invention.
FIGS. 10 and 11 are respective perspective and sectional illustrations of engagement apparatus for engaging the apparatus of the present invention for unfolding.
FIG. 14 is a perspective view of a portion of the apparatus of FIG. 12.
FIG. 15 is a sectional illustration taken along line A—A of FIG. 14.

After the plants have partially developed in vessel 28, they must be separated from one another and transferred to a second growth medium for continued growth. There is illustrated in FIG. 8 one tool suitable for preparing a second growth medium, for transfer of partially developed plants. The apparatus comprises a rigid plate 76 in which are disposed a plurality of spike elements 78. Plate 76 and spike elements 78 may be formed of any suitable material including wood, plastic, or metal. Spike elements 78 are located on plate 76 at distances from one another corresponding to the desired planting distances of the plantlets to be transferred and are of the size required for the planting holes of the plantlets. It will be appreciated that the locations of the spike elements corresponds to the locations of plant development locations 12 when receptacle 10 is in its unfolded orientation. Plate 76 is laid on the surface of the second growth medium and pressed into the medium. Spike elements 78 thereby punch planting holes into the medium. When plate 76 is removed, the second growth medium is ready for the transfer of partially developed plants. It will be appreciated that any other device for providing planting holes of the required size and location may alternately be employed.

Figure 9:
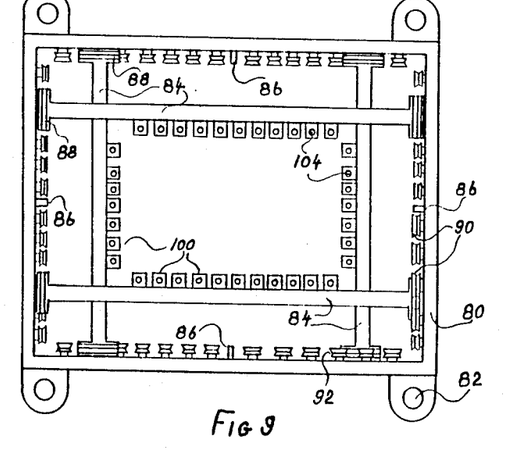
FIG. 9 is a top view illustration of apparatus for unfolding plant growth and devlopment apparatus constructed and operative in accordance with an embodiment of the present invention.

Referring now to FIG. 9 there is shown apparatus for reorienting the plant growth and development apparatus from its first, folded orientation to its second, unfolded orientation. The apparatus comprises a rigid frame 80 preferably arrangable in a horizontal position for slideable up and down motion as along tubular pipes (not shown) by means of rings 82. Slideably mounted within frame 80 are two pairs of sliding bars 84, each pair being mounted in frame 80 perpendicular to the other to permit simultaneous movement along two perpendicular axes. Stop members 86 are provided in frame 80 midway along each of its sides.

Figure 12:
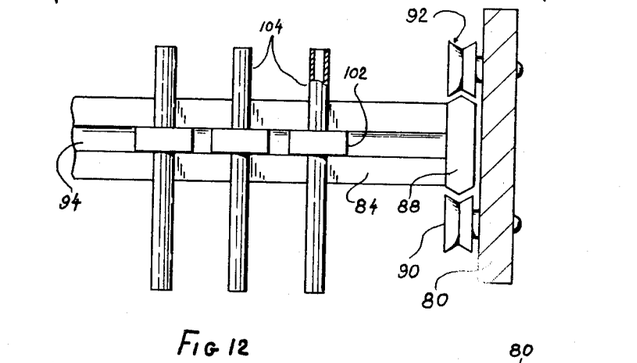
FIG. 12 is a side view illustration from the center of a portion of the apparatus of FIG. 11.
Figure 13:
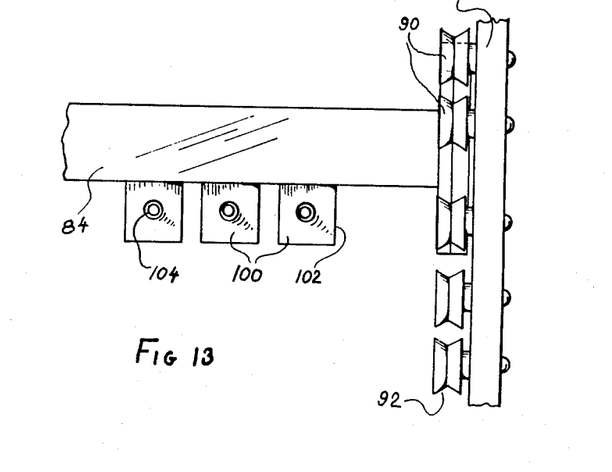
FIG. 13 is a top view illustration of a portion of the apparatus of FIG. 12.

Sliding bars 84 each define a mounting element 88 of a particular profile at either end thereof arranged for slideably mounting between upper and lower parallel rows of bearing elements 90, defining a profile 92 complementary to the profile of mounting elements 88, rotatably affixed to frame 80 so as to define a track for the movement of sliding bars 84. Sliding bars 84 can slide freely between bearing elements 90 from a contracted orientation, wherein mounting elements 88 engage stop members 86, to an expanded orientation, wherein mounting elements 88 engage frame 80 itself. The mounting of sliding bars 84 onto frame 80 between bearing elements 90 can be seen more clearly in FIG. 12.

Slideably mounted within sliding bars 84 are a plurality of engagement elements 100 for engaging the edges of receptacle 10, which are illustrated in greater detail in FIGS. 10 to 15. Each engagement element 100 comprises a slideable member 102 for slideable engagement with a groove 94, defined along the length of sliding bar 84, and a hollow, cylindrical tube element 104 mounted in and perpendicular to member 102. Slideable member 102 defines a plurality of recesses 106 in which are disposed balls 108, preferably steel. Balls 108 are free to rotate within recesses 106 but cannot escape therefrom.

With particular reference to FIG. 15, there is seen in sectional view one engagement member 100 mounted within groove 94 of sliding bar 84. Groove 94 defines a track along which engagement member 100 is freely slideable and which preferably defines channels 96 for movement of balls 108.

With further reference to FIG. 9, it can be seen that one pair of slideable bars 84, of necessity, is mounted above the other in frame 80. The bottom surface of tube elements 104 must lie in a single plane, in accordance with this embodiment of the invention. Accordingly, it will be appreciated that tube elements 104 slideably mounted in slidable bars 84 which are mounted in the upper portion of frame 80 are longer than tube elements 104 slideably mounted in slidable bars 84 which are mounted in the lower portion of frame 80.

Operation of the reorienting apparatus will now be described with further reference to FIGS. 9 and 5. When it is desired to transfer partially developed plants from vessel 28 to a second growth medium which has been prepared to receive them, vessel 28 is opened and seated beneath frame 80 which has been raised to permit it to be placed there. The base of vessel 28 is fixed in place. Sliding bars 84 on frame 80 are moved into their contracted orientation adjacent stop members 86. In this orientation, engagement members 100 are crowded adjacent one another and adjacent engagement members 100 are separated from one another by the same distance as between edge surface locations 20 on receptacle 10. Frame 80 is now lowered until the bottom surfaces of tubes 104 contact the edge surface locations 20 in registration therewith. It will be evident that the exact dimensions of elements 86, 88 and 100 will be preselected so as to effect the desired registration with locations 20 of receptacle 10 with the latter in its smaller, unfolded orientation, in the manner just described. Moreover, the movement of each of the elements 100 which are at the end of each row on bars 84 is restricted by mechanical means (not shown) in order to prevent interference of one such end member with another.

Tubes 104 are coupled to vacuum means (not shown) and vacuum is applied to tubes 104 in any conventional manner until edge surface locations 20 are firmly engaged by tubes 104 and receptacle 10 is lifted out of vessel 28. Some agar will cling to the beginning root of the plantlet, as well as remaining within conical funnels 13. Frame 80 is now raised, lifting receptacle 10 from vessel 28. Slideable bars 84 are moved by any conventional means, including mechanical, electrical hydraulic, pneumatic or any other means, to their expanded positions, causing engagement members 100 to distribute themselves evenly along lengths thereof, as receptacle 10 unfolds to its flat, unfolded orientation. When slideable bars 84 reach their totally expanded positions, receptacle 10 is completely unfolded and plant growth locations 12 are located at the desired separation from one another for further growth and development.

Frame 80 is now moved over the prepared second growth medium means, such as a growing table, and lowered until the bottoms of the partially developed plants are located near to and above the planting holes defined in the medium. The plants are now transferred from receptacle 10 to the second growth medium by any desired means. With reference to FIG. 16 there is shown one embodiement of apparatus for transferring partially developed plants. The apparatus comprises a frame 120 in which are mounted a plurality of tubes 122, each mounted in a location corresponding to a plant growth location on unfolded receptacle 10. Tubes 122 are coupled to vacuum means (not shown). Mounted within tubes 122 are secondary tubes 124 which have a diameter somewhat larger than that of the plants. Secondary tubes 124 are coupled to a source of pressurized air (now shown).

Frame 120 is mounted over receptacle 10 on the second growth medium and lowered until each of secondary tubes 124 surrounds a partially developed plant and touches the surface of receptacle 10. The vacuum source is now activated, and the suction in tubes 122 firmly engages repectacle 10. The pressurized air source coupled to secondary tubes 124 is now activated and provides a burst of pressurized air sufficient to eject the plantlets through apertures 14 in receptacle 10 into the planting holes in the second growth medium therebelow. It will be appreciated that the small amount of agar in funnels 13 will act as releasable packing to increase the efficiency of ejection.

It will be appreciated by those skilled in the art that the present invention is not limited to what has been shown and described hereinabove merely by way of example. Rather, the scope of the invention is limited solely by the claims which follow.

I claim:

1. Apparatus for plant growth and development comprising:

a plant precursor development receptacle, means defining a plurality of plant development locations thereon, said receptacle including means whereby it can be oriented in at least two operative orientations wherein, in a first of said at least two operative orientations, the plant development locations are spaced from one another by a first distance, and, in a second of said at least two operative orientations, the plant development locations are spaced from one another by a second distance materially greater than said first distance;

distribution means for distributing a plant precursor to each of said plant development locations when said receptacle is oriented in said first operative orientation, which distribution means comprises an apertured sheet having apertures and means for communicating said apertures in one-to-one relation with said plant development locations when said receptacle is in said first operative orientation; and means for removably blocking exit from said apertured sheet as plant precursors are distributed over said apertured sheet for filling each of the apertures therein with a single plant precursor.

2. Apparatus according to claim 1 and also comprising means for reorienting said receptacle from said first operative orientation to said second operative orientation with partially developed plants located in said plant development locations.

3. Apparatus according to claim 2 and wherein said reorienting apparatus comprises a plurality of engagement means movable simultaneously along two perpendicular axes for removable engagement with portions of said receptacle for effecting unfolding thereof in a plane.

4. Apparatus according to claim 1 and wherein said development receptacle comprises a foldable element which assumes said first operative orientation when folded and assumes said second operative orientation when unfolded.

5. Apparatus according to claim 1 and wherein said development receptacle also includes an aperture located at each development location.

6. Apparatus according to claim 1 and further comprising growth medium means arranged to underlie said plant development locations when said receptacle is oriented in its first orientation.

7. Apparatus according to claim 1 and also comprising means for disengaging said partially developed plants from said development locations and relocating them in different plant development locations apart from said receptacle when said receptacle is oriented in its second operative location.

8. Apparatus according to claim 7 and wherein said disengaging means comprises apparatus for engaging said partially developed plants with a flow of pressurized gas.

9. Apparatus for plant growth and development comprising:

a plant precursor development receptacle, means defining a plurality of plant development locations thereon, said receptacle including means whereby it can be oriented in at least two operative orientations wherein, in a first of said at least two operative orientations, the plant development locations are spaced from one another by a first distance, and, in a second of said at least two operative orientations, the plant development locations are spaced from one another by a second distance materially greater than said first distance; and means for disengaging said partially developed plants from said development locations and relocating them in different plant development locations apart from said receptacle when said receptacle is oriented in its second operative location, and wherein said disengaging means comprises apparatus for engaging said partially developed plants with a flow of pressurized gas.

10. Apparatus according to claim 9 and also comprising means for reorienting said receptacle from said first operative orientation to said second operative orientation with partially developed plants located in said plant development locations.

11. Apparatus according to claim 10 and wherein said reorienting means comprises a plurality of engagement means movable simultaneously along two perpendicular axes for removable engagement with portions of said receptacle for effecting unfolding thereof in a plane.

12. A method of plant development comprising the steps of:

distributing plant precursors in a plant development receptacle associated with a first growth medium in a first spatial orientation, producing partial plant development of said plant precursors in said first growth medium, changing the orientation of said plant development receptacle to a second spatial orientation wherein the spacing between the resulting plants is materially increased, and transferring the resulting plants from said plant development receptacle in said second spatial orientation to a second growth medium at locations therein which are in registration with the orientation of said resulting plants in said second spatial orientation, and wherein said transferring step includes applying a flow of pressurized gas to at least one said resulting plant for removing it from said receptacle and disposing it to said second growth medium.

13. A method according to claim 12 and wherein said changing step comprises the step of unfolding said receptacle from said first spatial orientation to said second spatial orientation.

14. A method according to claim 13 and wherein said plant precursors are selected from the group consisting of seeds and tissue culture elements.

15. A method according to claim 12 and wherein said plant precursors are selected from the group consisting of seeds and tissue culture elements.

16. A method according to claim 12 and wherein said step of distributing plant precursors comprises the step of distributing seeds.

17. A method according to claim 12 and wherein said step of distributing plant precursors comprises the step of distributing tissue culture elements.

18. A method according to claim 12 and wherein said distributing step includes the steps of providing an apertured sheet having apertures and means for communicating said apertures in a one-to one relationship with plant precursor locations in said receptacle in said first spatial orientation, and distributing plant precursors over said plant such that a single precursor is located in each of said apertures.

* * * * *